United States Patent [19]

Dieckmann et al.

[11] 4,439,125

[45] Mar. 27, 1984

[54] ADJUSTABLE DIE MECHANISM

[75] Inventors: J. Robert Dieckmann, Akron, Ohio; Richard E. Burg, Grayslake, Ill.; Louis Laurich, Barberton; J. Richard McCarty, Akron, both of Ohio

[73] Assignee: The Firestone Tire & Rubber Company, Akron, Ohio

[21] Appl. No.: 363,976

[22] Filed: Mar. 31, 1982

[51] Int. Cl.³ .................................................. B29F 3/04
[52] U.S. Cl. ...................................... 425/140; 264/40.4; 264/40.5; 264/40.7; 425/141; 425/145; 425/146; 425/163; 425/172; 425/376 A; 425/381; 425/465; 425/466
[58] Field of Search ............... 425/140, 141, 145, 146, 425/163, 172, 381, 376 A, 465–466; 264/40.2, 40.4, 40.5, 40.7

[56] References Cited

U.S. PATENT DOCUMENTS

| | | | |
|---|---|---|---|
| 1,252,821 | 1/1918 | Lewis | 425/466 |
| 2,083,557 | 6/1937 | Crane et al. | 425/172 |
| 2,566,854 | 9/1951 | Rhodes | 264/40.7 |
| 2,720,679 | 10/1955 | Ratliff | 425/381 |
| 3,003,245 | 10/1961 | Nunez, Jr. | 425/376 R |
| 3,122,782 | 3/1964 | Moore | 425/141 |
| 3,122,783 | 3/1964 | Jolliffe et al. | 425/141 |
| 3,122,784 | 3/1964 | Jolliffe | 425/141 |
| 3,150,213 | 9/1964 | Doering | 425/140 |
| 3,195,183 | 7/1965 | Phillips | 425/466 |
| 3,212,127 | 10/1965 | Flook, Jr. et al. | 425/141 |
| 3,268,950 | 8/1966 | Rankin | 425/466 |
| 3,323,169 | 6/1967 | Vitellaro | 425/466 |
| 3,510,374 | 5/1970 | Walker | 425/141 |
| 3,599,288 | 8/1971 | Eakman | 425/172 |
| 3,782,873 | 1/1974 | Lynnknowles | 425/141 |
| 3,830,610 | 8/1974 | Ohkawa et al. | 425/141 |
| 3,854,859 | 12/1974 | Sola | 425/381 |
| 3,870,453 | 3/1975 | Howard | 425/465 |
| 3,884,611 | 5/1975 | Anderson et al. | 425/376 R |
| 3,940,221 | 2/1976 | Nissel | 425/141 |
| 4,125,350 | 11/1978 | Brown | 425/381 |

FOREIGN PATENT DOCUMENTS 63039  1/1914  Austria ......................... 425/381

OTHER PUBLICATIONS

New Products & Equipment, Rubber & Plastics News, Aug. 6, 1979, p. 30.

Primary Examiner—Jeffery R. Thurlow
Attorney, Agent, or Firm—Ernst H. Ruf

[57] ABSTRACT

An adjustable die mechanism (10) for extruding a profiled strip of plastic or elastomeric material wherein a plurality of adjacent segments (44) is located upstream and in spaced relation from a final extrusion die assembly (32), having a predetermined profiled opening (38), with this plurality of segments (44) being mounted for individual and independent adjustment thereof, each segment having one end (46) capable of extending into the extrudate flow channel (26). Means for actuating (64) move the segments (44) relative to the profiled opening (38) in a predetermined manner such that moving the segments (44) into the profiled opening (38) modifies the flow of the extrudate material downstream of the segments (44) as the profiled strip emerges from the die assembly (32). The die mechanism includes control means (82) for selectively operating the means for moving the segments so as to produce a strip of material having the desired characteristics.

13 Claims, 3 Drawing Figures

ADJUSTABLE DIE MECHANISM

TECHNICAL FIELD

The field of art to which this invention pertains is that of adjustable die mechanisms for extruding profiled strips of plastic or elastomeric material, specifically profiled extrusion dies with adjustable upstream segments.

In the rubber industry, particularly in the tire industry, it is quite common to utilize profiled extrusion dies for producing elastomeric tire components such as tire treads used in the manufacture of pneumatic tires.

The set up for extruding a profiled shape of elastomeric material is a costly process, since the desired extrusion has to have both the correct shape or profile as well as weight. Generally, several die trials with recutting or reshaping of the die are often necessary. During these trials, the extrudate is usually scrapped and must then be reworked into the process. Similar problems generally also occur when a previously-run die is utilized and the operator at each run must still adjust equipment speeds until dimensionally correct on-weight profiles are obtained.

There are many problems that occur in this type of an operation because profile variations can also be caused by the extrusion process or the material being extruded. For example, day-to-day line variations require different equipment speed settings with the same production die. Similarly, because of unbalances in the extruder die head, non-symmetrical dies may even be required to obtain a symmetrical profile. Stock variations and temperature variations also can cause dimensional and weight changes during a production run.

BACKGROUND ART

U.S. Pat. No. 2,720,679 to Ratliff, discloses a plurality of dam segments that may be individually adjusted so as to provide the desired cross sectional contour of the tire tread being extruded. However, FIG. 6 discloses that the variable dam segments are not disposed upstream from the final die, but in fact, form the final die. A similar die wherein again the adjustable extrusion die appears to be the final die is shown in U.S. Pat. No. 3,195,183 to Phillips.

U.S. Pat. No. 3,323,169 to Vitellaro also discloses a plurality of dam segments which may be adjusted independently with this adjustment being carried out via a motorized adjusting means.

U.S. Pat. No. 3,884,611 to Anderson, et al., discloses an extrusion die wherein a section of the die is thin-walled in construction and extends across the width of the flow channel prior to the outlet from the die. An adjusting mechanism is operative to decrease the cross sectional dimension across a pre-land area by flexing or distorting the thin-walled segment.

U.S. Pat. Nos. 3,940,221 to Nissel and 4,125,350 to Brown are cited for their showing of a controllable die lip so as to control both the position and size of the die lip, with the patent to Nissel further disclosing a control and measuring apparatus.

U.S. Pat. No. 3,870,453 to Howard is cited for its disclosure of an adjustment mechanism for an extruder die having an adjustable and a movable die portion.

U.S. Pat. No. 3,830,610 to Ohkawa, et al., discloses an adjustable contour die having a plurality of vertically adjustable individual upper die sheets for achieving specific contours and a control system for effecting same.

DISCLOSURE OF THE INVENTION

The present invention provides a solution to the prior art problems pertaining to the profiled extrusion of elastomeric materials by utilizing a variable preform die upstream and in spaced relation from the normal extrusion die assembly.

This preform die takes the form of a series or pluralities of adjacent segments that are mounted for individual and independent adjustment thereof wherein each segment has an end capable of extending into the extrudate channel and thus into the strip of material being extruded.

The present invention includes means for moving these segments relative to a profiled opening in the final extrusion die assembly in such a predetermined manner that moving the segments into the projection of the profiled opening modifies the flow of the extrudate material downstream of the segment as the material emerges from the die assembly.

The present invention further includes control means for selectively operating the means for moving the segments, thereby producing a strip of plastic material having the desired characteristics, wherein this desired characteristic may be strip profile, weight and/or mass.

The present invention also includes a plurality of various control means for monitoring, checking, correcting and implementing control strategies to produce materials having the desired characteristics.

The placement of the adjustable segments upstream of the fixed die modifies the flow of the extrudate to the final die assembly and thus the final extrudate characteristics. The use of the final extrusion die assembly downstream from the adjustable segments eliminates the discreet steps on the profile and the possible consequent curing defects which could be caused by such steps.

The adjustable die mechanism of the present invention compensates, to a large extent, for the everyday variables present in most extrusion process systems. The benefits achieved include better profile uniformity, resulting in better final product uniformity; material and energy savings by target shifting to the light side of gauges and weight; reducing or eliminating die tryouts; as well as achieving higher productivity. In addition, extrusion die making can be simplified and use of the present invention may possibly even lead to the mechanization of die making. For example, the final die can be made to produce approximately the desired extrusion with the movable segments adjusted to the mid position, such that raising or lowering individual segments, or a combination of them, will increase or decrease the extrudate flow at particular areas of the extrusion as it emerges from the final die, thereby achieving such modification of the extruded shape as is necessary to produce a strip of elastomeric material having the desired characteristics.

One preferred embodiment of the adjustable die mechanism control means is shown by way of example in the accompanying drawings and described in detail without attempting to show all of the various forms or modifications in which the invention might be embodied. The features and advantages of the invention will become more readily understood by persons skilled in the art when following the best mode description in conjunction with the several drawings.

BEST MODE FOR CARRYING OUT THE INVENTION

Figure 1:
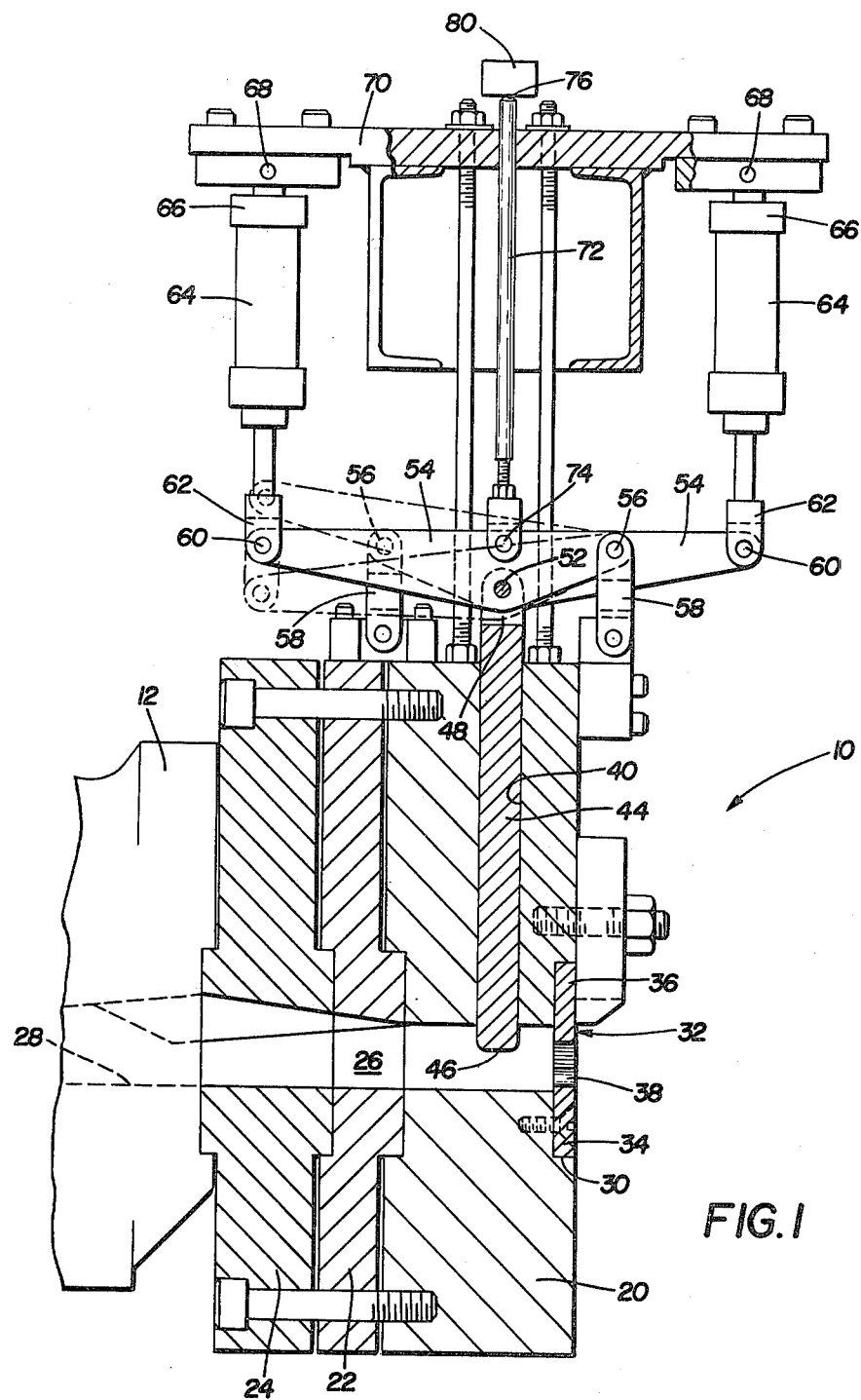
FIG. 1 is a sectional view, to an enlarged scale, taken generally along line 1—1 of FIG. 2, of the adjustable die mechanism of the present invention.
Figure 2:
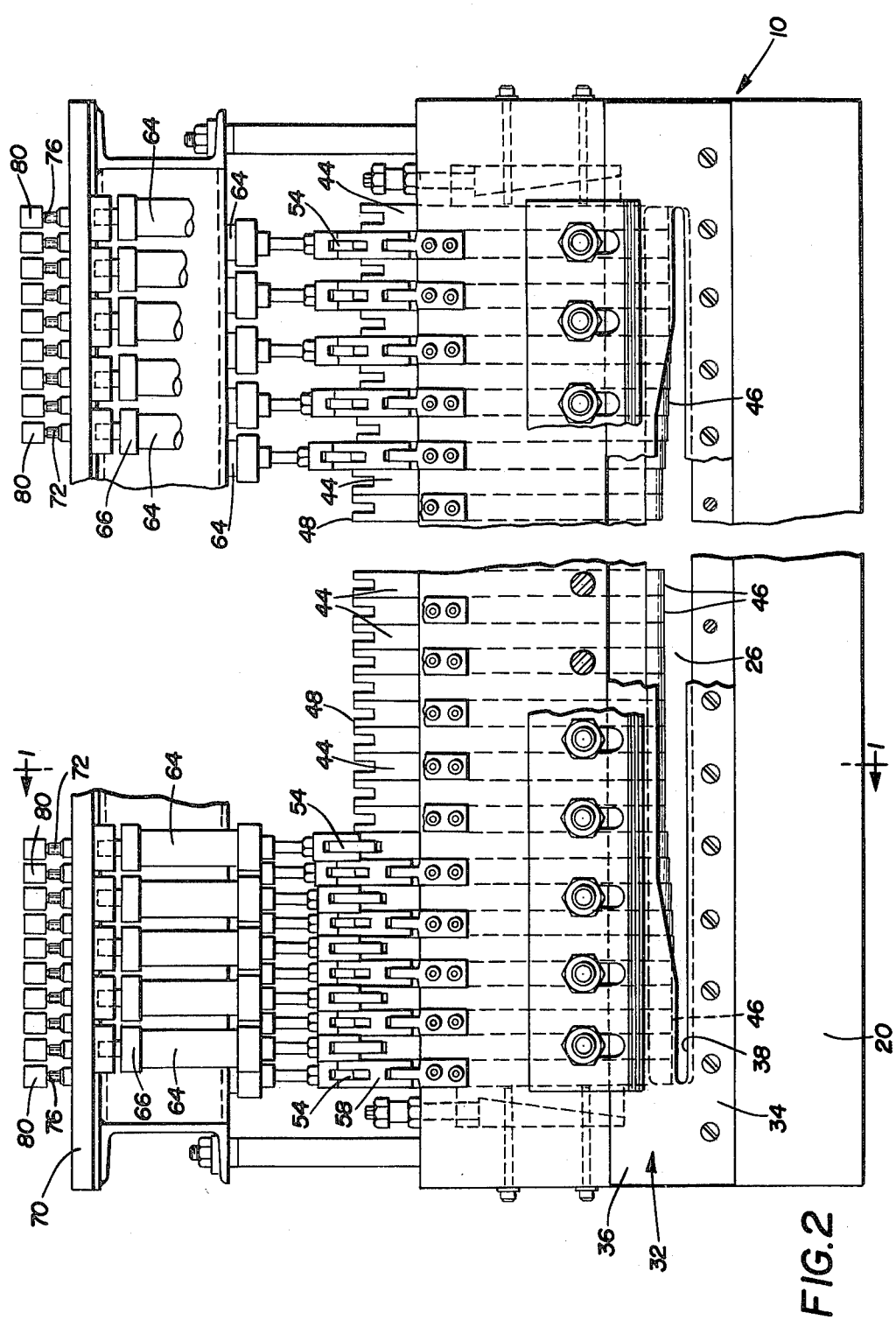
FIG. 2 is a simplified front view, with some parts broken away for the sake of clarity, of the adjustable die mechanism.

Referring now to the drawings, specifically FIGS. 1 and 2, numeral 10 denotes an adjustable die mechanism mounted upon the delivery end 12 of any desired type of an extruder (not shown) for producing a profiled strip or sheet of plastic or elastomeric material (not shown).

Adjustable die 10, which includes an apertured die block 20, together with adaptor plates 22 and 24 attached thereto, is affixed, in any desired manner to extruder delivery end 12. Die channel or cavity 26, extending through die block 20 and adaptor plates 22 and 24, registers with extruder delivery channel 28, with extruded material entering die channel 26 therefrom.

The outer or exit end of die channel 26 is provided with a recess 30 adapted for the insertion and fastening of a final extrusion die assembly 32, having an opening 38 of predetermined profiled shape which is of a cross sectional size less than that of die channel 26. If desired, die assembly 32 may include a separate base plate 34 and a separate upper plate 36, said plates cooperating to define profiled opening 38.

Die block 20 is provided with a transverse slot or opening 40, preferably perpendicular to the major axis of die cavity 26 and of a transverse extent at least as great as the transverse extent of profiled opening 38. Slot 40, which is parallel with die assembly 32, but located upstream therefrom a predetermined distance, contains a series or pluralities of adjacent blocks, segments, dams, or baffles 44, with all of segments 44, while being adjacent to one another, being capable of individual and independent reciprocal adjustment, via generally rectilinear motion thereof, in a manner to be discussed hereinafter. Segment inner ends 46 are at least capable of partially (or if desired, fully) extending into die channel 26 and thus into the strip of elastomeric or plastic extrudate being conveyed therethrough.

Each segment outer end 48 extends out of die block channel 40 and is pivotally connected, via pin 52, to an intermediate portion of an actuating arm 54 which in turn is pivotally connected on one end, via pin 56, to a pivot link 58. The other end of arm 54 is also pivotally connected, via pin 60, to a piston rod and clevis assembly portion 62 of an actuating means 64 which may take the form of a dual acting fluid pressure operated piston and cylinder apparatus. A clevis cap 66, on the other end of actuating means 64 is pivotally attached, via pin 68, to one longitudinal edge of a retainer plate 70 rigidly affixed to die block 20 in any desired manner.

As best seen in FIG. 1, adjacent ones of actuating arms 54 are oppositely directed, thus resulting in two parallel rows of actuating means 64. The reason for this construction is that the physical size of the particular type of actuating means 64 is such as to discourage adjacent placement of successive units. As best seen in FIG. 2, the sheer number of individual segments 44 suggests the alternate-row spacing and attachment of actuating means 64 to retainer plate 70.

Returning now to FIG. 1, it will be noted that a position indicating rod or member 72 is also pivotally attached to each actuating arm 54, via pin 74, in axial alignment with each segment 44. Members 72 extend through an aperture in retainer plate 70, with the outer end 76 of each member 72 being operatively connectable with a position readout device 80 which will be more fully discussed hereinafter.

In one operative example of the present invention, adjustable die mechanism 10 included the use of 36 rectilinearly adjustable ¾-inch wide steel segments 44 abutting side by side across die channel 26 about one inch ahead or upstream of final extrusion die assembly 32. The assembly containing this arrangement was part of a die mechanism having a 26¾-inch wide die channel.

Segments 44 are moved by actuating means 64 acting on segment ends 48 via actuating arm 54 pivoting around the axis of pin 56. The position of each segment 44 is monitored by a position readout device 80, such as an "LVDT" or linear voltage displacement transducer (for example, a series 240 displacement transducer available from Trans-Tek Incorporated of Ellington, Conn.) or any well-known dial-type displacement gauge, interacting with each position-indicating member 72.

Appropriate valving (not shown), of well-known design, for controlling actuating means 64 is operated by signals from an associated central die control system. The central die control system may have numerous configurations dependent upon the specific application of adjustable die mechanism 10. However, inasmuch as certain control functions are preferably common to all applications, a central die control system having such characteristics (generally identified in FIG. 3 with the numeral 82) is presented hereinwith.

Central die control system 82, hereinafter referred to as control system 82, performs several basic functions. First, it monitors the profile of the extrudate as it is produced (the "instantaneous extrudate profile"), compares the same to a desired profile, and, where deviations equal to or greater than a preselected minimum threshold are found, it generates the necessary signals for operating actuating means 64 to achieve the desired profile. Additionally, it insures that when making the comparison between the instantaneous extrudate profile and the desired profile the two profiles are properly aligned.

It has been found preferable to correct deviations between the instantaneous extrudate profile and the desired profile by first suitably adjusting the segment 44 at the location having the greatest magnitude of deviation, and then proceeding to adjust the remaining segments 44 in descending order based upon the magnitude of deviation at their respective locations. When the magnitude of deviation at the location of all segments 44 are all less than a preselected threshold, a new comparison may be made and the process of correction begun again.

Figure 3:
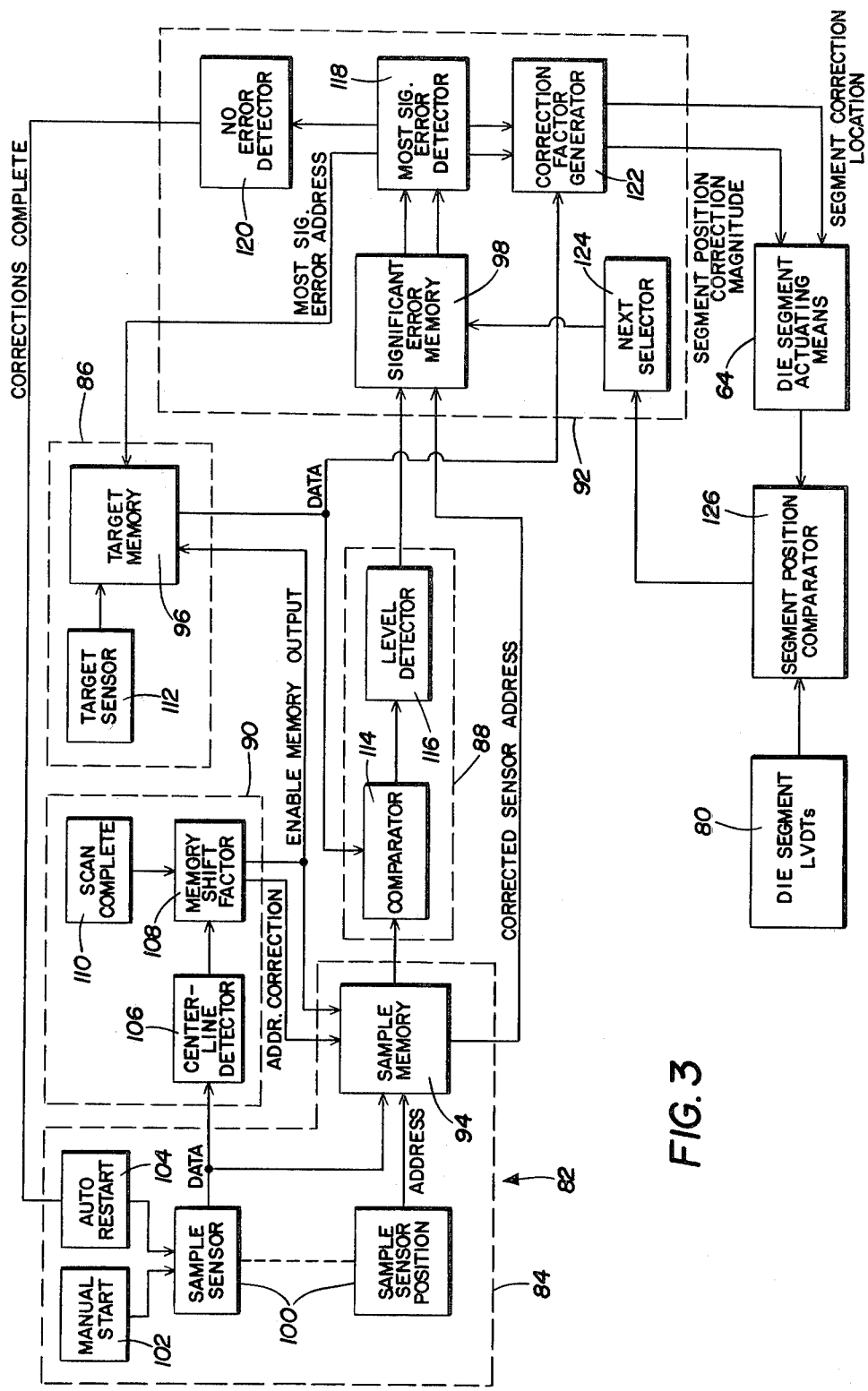
FIG. 3 is a flow diagram illustrating a control method for the present invention.

As best seen in FIG. 3, control system 82 includes extrudate profile sensor and memory circuit 84, target profile sensor and memory circuit 86, profile error detection circuit 88, profile alignment circuit 90, and correction factor generator circuit 92. Extrudate profile sensor and memory circuit 84 (hereinafter called "sample circuit 84"), target profile sensor and memory circuit 86 (hereinafter called "target circuit 86"), and profile error detection circuit 88 each contain a conventional digital memory, denoted 94, 96 and 98 respectively, for respectively storing the magnitude of the instantaneous extrudate profile, the magnitude of the desired or "target" profile, and the magnitude (if at least equal to a preselected threshold) of the deviation therebetween at a preselected number of locations across die channel 26. Where memories 94, 96 and 98 are selected to contain an identical number of addresses of a quantity at least equalling the preselected number of locations across die channel 26, a unique correspondence will exist between the data stored in a particular address of each memory and a particular location across die channel 26.

Sample circuit 84 provides the necessary elements to sample and store the instantaneous extrudate profile. Sample sensor 100 includes a plurality of position readout devices (similar to LVDTs 80 described hereinabove) which when actuated manually by pushbutton 102 or automatically by means of auto restart 104 scan the instantaneous extrudate profile. The LVDTs provide a digital signal indicative of the thickness of the extrudate at each of the preselected locations across die channel 26 and this information is stored in sample memory 94.

The instantaneous extrudate profile data is received by profile alignment circuit 90 simultaneously with the data's receipt by sample profile memory 94. Profile alignment circuit 90, which includes a center line detector 106, a memory shift factor 108 and a scan complete monitor 110, serves to correlate the center of the sensor profile data with that of the target profile data so that no error is introduced as a result of misalignment. This correlation is accomplished in two steps. First, center line detector 106 locates the center of the instantaneous extrudate profile by monitoring, for example, a sharp discontinuity in the sample sensor data introduced in the extrudate by the placement of a small notch in the center of opening 38 in final extrusion die assembly 32. Upon completion of a scan of the entire width of the instantaneous extrudate, scan complete 110 generates an actuation signal which initiates the second step of the correlation. During this second step, memory shift factor 108 determines the extent to which the data in sample memory 94 must be "shifted" such that when compared with the data in target memory 96 the proper correlation exists. However, instead of actually shifting the data in sample memory 94, the signal from memory shift factor 108 simply suitably alters the address of the data in sample memory 94 at which the comparison is begun, thereby achieving the same correction.

It should be appreciated that the center of the instantaneous extrudate profile may be ascertained by any of the numerous other well-known techniques. For example, combination light generator and light-sensitive sensors are frequently utilized as edge detectors in extrusion systems and the center found from this information.

A target profile may be scanned simultaneously with that of the instantaneous extrudate profile by means of another plurality of LVDTs similar to that noted hereinabove (shown in FIG. 3 as target sensor 112), or other suitable mechanism to examine like locations in the sample and target profiles at the same time. Alternately, data indicative of the desired profile could be electronically loaded into target memory 96 at any time prior to comparison of the data in sample memory 94 with the data in target memory 96.

After any necessary starting address correction has been received by and made to sample memory 94, memory shift factor 108 simultaneously enables the output of both sample memory 94 and target memory 96 so that the data in each corresponding memory address may be sequentially compared by comparator 114 in profile error detection circuit 88, and an output signal generated therefrom proportional to the difference between the thicknesses of the instantaneous extrudate profile and desired profile. The output signal from comparator 114 (which may be referred to as the "error data") is received by another element of profile error detection circuit 88, level detector 116. Level detector 116 examines the magnitude of the error data and generates either an output indicative of a zero error (when the magnitude of the error data is less than a preselected threshold magnitude), or an output proportional to the error data (when the magnitude of the error data is at least equal to the preselected threshold magnitude). The output signal from level detector 116 (which may be known as the "significant error data") is received by and stored in significant error memory 98 at addresses corresponding to the location across die channel 26 of that particular error magnitude. Thus, only thickness deviations at least equal to the preselected threshold magnitude are deemed necessary for correction and retained.

As significant error memory 98 receives error data from level detector 116, such data is simultaneously transmitted to most significant error detector 118, which together with no error detector 120, correction factor generator 122 and next selector 124 make up correction factor generator circuit 92. Most significant error detector 118 may be a conventional peak hold circuit which retains the greatest error location and magnitude stored in significant error memory 98. Upon receipt of the last error data address in significant error memory, the address of the most significant error is sent to both target memory 96 and correction factor generator 122, and the magnitude of the most significant error also sent to correction factor generator 122. Target memory 96 provides to correction factor generator 122 the magnitude of the desired profile thickness from the received address. Correction factor generator 122 then selects the appropriate die segment actuating means 64 to correct for the most significant thickness deviation and processes the error signal and the magnitude of the desired profile thickness to generate a signal to the selected actuating means of appropriate characteristic to suitably correct for the most significant thickness deviation found.

Segment position comparator 126 receives a signal from the selected die segment actuating means 64 indicative of the necessary correction and receives a signal from the die segment LVDTs associated with the segment operated by the selected die segment actuating means 64. When the necessary correction is determined to have occurred, segment position comparator 126 furnishes an output signal to next selector 124. Next selector 124 loads a number indicative of no error into the address containing the error data for the location at which the deviation was just eliminated, and resets significant error memory 98 such that it again scans through all error data therein. As previously described, most significant error detector 118 receives and retains the magnitude and location of the remaining greatest error and the correction process continues. When no error is found in significant error memory 98, all corrections have been completed and no error detector 120 furnishes a signal to auto restart 104 to make another scan of the instantaneous extrudate profile as delineated hereinbefore.

It should be understood that in order for segments 44 to operatively effect the extrudate, segment inner ends 46 must extend into die channel 26 for a distance sufficient to enter into the projection or silhouette of profiled opening 38 in extrusion die assembly 32. Furthermore, segments 44 must move individually and differentially in order to produce a specific change in the profile.

It should be further understood that since there are different profiles which can be produced, the exact number and transverse extent of segments 44 may be substantially varied, depending on the desired resulting contour. In addition, the resulting profile will depend upon additional variables, which include the type of material being processed (physical characteristics, temperature, uniformity and plasticity), the ratio of the height of the die channel to the average height of the profiled opening in the final extrusion die assembly, as well as the distance upstream of segments 44 from the rear surface of extrusion die assembly 32.

The action of series or pluralities of adjacent segments 44 may be analogized, for discussion purposes, to that of a variable preform die. The benefit of such a plurality of segments 44, or preform die, upstream of the final die is that segments 44 tend to preshape or preform the extrudate, with the final shaping being done by die assembly 32, thereby avoiding the striations or stair-step effect that results when the variable dam segments in fact form the only or final die. Furthermore, the use of a variable preform die in combination with a final or finish die not only simplifies construction and increase the permissible dimensional tolerances of the final extrusion die assemblies, but also permits compensation for the extrusion profile variation caused by the extrusion process itself or the material being extruded.

In addition, where the speed of a take away conveyor is utilized in conjunction with adjustable die mechanism 10 to control various extrudate characteristics, the use of a preform die may be expected to at least reduce the need for conveyor speed variations.

Preferably, the profiled opening 38 in final extrusion die assembly 32 may be up to 10% oversize at least in terms of dimensional height, in order to provide the maximum benefit in terms of profile or shape control through the use of the preform die in the manner previously described.

As previously noted, the placement of segments 44 upstream of final die assembly 32 modifies the flow of the extrudate to die 32 and thereby modifies the final shape. Furthermore, the use of the final die assembly 32 eliminates the discrete steps on the profile and the consequent curing defects which may be caused by such steps. If desired, a flexible diaphragm may be interposed between segments 44 and the extrudate to promote an even more uniform gauge change and to seal the segments against any extrudate which may leak between them and thereafter jam them, and thus prevent the adjustment thereof.

Testing of prototypes has shown a correction in the range of at least plus or minus 10% of the original gauge and profile. It should be understood, however, that due to the plurality of influencing factors in an extrusion process of this type, changes in the detail of construction may be resorted to and different results may be obtained.

From the foregoing description, when read in the light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. An adjustable die mechanism for extruding a profiled strip of plastic material, comprising:
   a. means for providing a flow channel, having a predetermined cross section, for the extrusion therethrough, starting at one end, of said strip of plastic material;
   b. a final extrusion die assembly located on the end opposite said one end and having a predetemined profiled opening, of a cross section preferably less than that of said channel, for extruding said strip of plastic material therethrough;
   c. a plurality of adjacent segments located upstream and in spaced relation from said extrusion die assembly for variably preforming the profiled strip of plastic material, said plurality of segments being mounted for individual and independent adjustment thereof, each segment having one end thereof capable of extending into said channel, and thus into said strip of plastic material;
   d. means for moving said segments relative to said profiled opening in a predetermined manner such that moving said segments into the projection of said profiled opening modifies the flow of said strip of plastic material downstream of said segments as said strip emerges from said die assembly; and,
   e. control means for selectively operating said means for moving said segments, thereby producing a strip of plastic material having the desired characteristics.

2. An adjustable die mechanism for extruding a profiled strip of plastic material, as set forth in claim 1, wherein said control means includes sensor means for monitoring, providing a signal indicative of and storing said desired characteristics of the profiled strip as it emerges from said die assembly.

3. An adjustable die mechanism for extruding a profiled strip of plastic material, as set forth in claim 2, wherein said control means further includes means for monitoring said desired characteristics of the profiled strip and providing a signal indicative thereof.

4. An adjustable die mechanism for extruding a profiled strip of plastic material, as set forth in claim 2 or 3, wherein said control means further includes means for receiving and storing a signal indicative of said desired characteristics.

5. An adjustable die mechanism for extruding a profiled strip of plastic material, as set forth in claim 4, wherein said control means includes error detection means for receiving and comparing said signal indicative of said desired characteristics and said signal indicative of said characteristics of the profiled strip as it emerges from said die assembly and providing an output signal proportional to the difference therebetween at preselected locations across said die channel when said difference at least equals a preselected threshold magnitude.

6. An adjustable die mechanism for extruding a profiled strip of plastic material, as set forth in claim 5, wherein said profiled strip of plastic material has edges, said control means includes alignment means for adjusting either of said signals received by said means for comparing to insure alignment of the center lines of said profiled strip as it emerges from said die assembly and the profiled strip having said desired characteristics irrespective of the location of the edges of said profiled strip and the profiled strip having said desired characteristics, prior to said comparison.

7. An adjustable die mechanism for extruding a profiled strip of plastic material, as set forth in claim 6, wherein said alignment means includes centerline detector means for locating and generating a signal indicative of the location of the longitudinal axis of said profiled strip as it emerges from said die assembly, and memory shift factor means for receiving said signal from said centerline detector means and generating a signal to correlate said stored data indicative of said profiled strip as it emerges from said die assembly with said signal indicative of the profiled strip having said desired characteristics.

8. An adjustable die mechanism for extruding a profiled strip of plastic material, as set forth in claim 6, wherein said control means includes means for receiving said output signal from said error detection means and comparing and generating correction factor signals for said preselected locations across said die channel sequentially in order of the greatest of said difference magnitude, said means for moving said segments receiving said correction factor signals and individually and independently adjusting said segments at the appropriate location to correct for said difference.

9. An adjustable die mechanism for extruding a profiled strip of plastic material, as set forth in claim 8, wherein said error detection means includes comparator means for receiving and comparing said signal indicative of the profiled strip having said desired characteristics and said signal indicative of said profiled strip as it emerges from said die assembly and providing an output signal proportional to the difference therebetween at preselected locations across said die channel, and level detector means receiving said signal from said comparator means and providing an output signal proportional to said signal from said comparator means only when said difference at least equals a preselected threshold magnitude.

10. An adjustable die mechanism for extruding a profiled strip of plastic material, as set forth in claim 9, wherein said means for comparing and generating correction factor signals includes significant error memory means for receiving and storing said signal from said level detector means, most significant error detector means for determining the magnitude and location across said die channel of the data stored in said significant error memory means representing the greatest error magnitude, and correction factor generator circuit means for generating said correction factor signals suitable to individually and independently operate said segments at the appropriate location to correct for said difference.

11. An adjustable die mechanism for extruding a profiled strip of plastic material, as set forth in claim 10, wherein said means for comparing and generating correction factor signals includes next selector means for eliminating error data stored in said significant error memory means indicative of said difference at the location just corrected and initiating another determination of said greatest error magnitude and location by said most significant error detector.

12. An adjustable die mechanism for extruding a profiled strip of plastic material, as set forth in claim 11, wherein said sensor means upon activation makes a single scan of said profiled strip as it emerges from said die assembly, said means for comparing and generating correction factor signals further including no error detector means for determining when no said error data is stored in said significant error memory means, said no error detector means generating a signal to automatically activate a new said single scan of said profiled strip as it emerges from said die assembly by said sensor means.

13. An adjustable die mechanism for extruding a profiled strip of plastic material, as set forth in claim 12, wherein said desired characteristic is strip profile.

* * * * *